US011690369B2

(12) United States Patent
Benjegerdes

(10) Patent No.: US 11,690,369 B2
(45) Date of Patent: Jul. 4, 2023

(54) METHOD AND APPARATUS FOR WEED CONTROL USING A HIGH INTENSITY LIGHT SOURCE

(71) Applicant: Troy Benjegerdes, Minneapolis, MN (US)

(72) Inventor: Troy Benjegerdes, Minneapolis, MN (US)

(*) Notice: Subject to any disclaimer, the term of this patent is extended or adjusted under 35 U.S.C. 154(b) by 527 days.

(21) Appl. No.: 16/204,820

(22) Filed: Nov. 29, 2018

(65) Prior Publication Data

US 2019/0159442 A1 May 30, 2019

Related U.S. Application Data

(60) Provisional application No. 62/591,904, filed on Nov. 29, 2017.

(51) Int. Cl.
*A01M 21/04* (2006.01)

(52) U.S. Cl.
CPC .................................. *A01M 21/04* (2013.01)

(58) Field of Classification Search
CPC ..... A01M 21/04; A01M 21/046; A01M 21/00
USPC .......... 47/58.1 LS, 58.1 R, 1.01 R, 1.3, 1.42, 47/1.43, 1.44, 1.5, 1.7
See application file for complete search history.

(56) References Cited

U.S. PATENT DOCUMENTS

| | | | | |
|---|---|---|---|---|
| 5,296,702 A * | 3/1994 | Beck | ................... | A01M 7/0089 |
| | | | | 250/226 |
| 5,789,741 A * | 8/1998 | Kinter | ..................... | G01J 3/10 |
| | | | | 209/582 |
| 5,929,455 A | 7/1999 | Jensen | | |
| 6,853,328 B1 * | 2/2005 | Guice | ..................... | G01S 7/411 |
| | | | | 342/28 |
| 7,571,075 B2 * | 8/2009 | Glenn | ...................... | A01G 7/00 |
| | | | | 47/1.7 |
| 8,872,136 B1 * | 10/2014 | Jackson | ................ | A01M 21/00 |
| | | | | 250/492.1 |
| 8,919,041 B2 * | 12/2014 | Topping | ................... | A01G 9/28 |
| | | | | 47/58.1 LS |
| 9,609,859 B2 * | 4/2017 | Stowe | .................... | A01M 21/04 |
| 2006/0265946 A1 * | 11/2006 | Schwager | ........... | A01M 21/046 |
| | | | | 47/1.3 |
| 2011/0209400 A1 * | 9/2011 | Rooymans | .............. | F21V 29/60 |
| | | | | 47/17 |
| 2013/0238201 A1 * | 9/2013 | Redden | ..................... | G06T 7/66 |
| | | | | 701/50 |
| 2015/0196002 A1 * | 7/2015 | Friesth | ................... | A01G 31/02 |
| | | | | 47/62 R |
| 2016/0205918 A1 * | 7/2016 | Chan | ...................... | A01M 21/04 |
| 2017/0030877 A1 * | 2/2017 | Miresmailli | ........... | A01G 25/16 |

(Continued)

FOREIGN PATENT DOCUMENTS

| | | | | |
|---|---|---|---|---|
| DE | 4028110 A1 * | 3/1992 | ............ | A01M 21/04 |
| WO | WO-2016191825 A1 * | 12/2016 | ............ | A01M 21/04 |

OTHER PUBLICATIONS

Ecorobotix. Printed Jul. 8, 2019. https://www.ecorobotix.com/en/. 4 pages.

(Continued)

*Primary Examiner* — Kathleen I Alker
(74) *Attorney, Agent, or Firm* — Vander Velden Law Firm, LLC; Melinda S. Vander Velden

(57) ABSTRACT

An apparatus and method for control of undesired vegetation. A renewable power source, tractor, and high intensity light source are provided and moved over an area of land. Exposure of unwanted vegetation to the high intensity light kills the unwanted vegetation.

2 Claims, 4 Drawing Sheets

(56) References Cited

U.S. PATENT DOCUMENTS

2017/0215405 A1* 8/2017 Kent ................... A01M 21/04
2020/0120917 A1* 4/2020 Jackson ............... A01M 21/04

OTHER PUBLICATIONS

Grid.coop. Printed Jul. 8, 2019. http://Grid.coop. 2 pages.
Growing Resources Flame Weeders. Printed Oct. 12, 2020. https://flameweeders.com/. 6 pages.
I&J Mfg. cover-crop rollers. Printed Oct. 12, 2020. https://croproller.com/. 5 pages.
Johnny's Selected Seeds Flame Weeders. Printed Oct. 12, 2020. https://www.johnnyseeds.com/tools-supplies/weed-control/flame-weeders/. 3 pages.
LASCO Lightning Weeder. Printed Oct. 12, 2020. https://www.lightningweeder.com/. 3 pages.
The Weed Zapper. Printed Oct. 12, 2020. https://theweedzapper.com/. 4 pages.
Troy Benjegerdes, "Iowa Grid: Open source infrastructure for time-of-day and location-based electric power trading," Iowa Power Fund application, submitted to the Iowa Power fund on or about Mar. 18, 2008.
Underground Agriculture ZRX Zone Roller cover crop roller/crimper. Printed Oct. 12, 2020. http://www.undergroundagriculture.com/ZRX-RollerCrimper.html. 2 pages.
Berthoud Electric weeder Green Power. Printed Jan. 23, 2022. https://www.youtube.com/watch?v=I89pcQ8dL2Q. 1 page.
Optocleaner. Printed Jan. 30, 2022. http://www.optocleaner.com/. 2 pages.

* cited by examiner

METHOD AND APPARATUS FOR WEED CONTROL USING A HIGH INTENSITY LIGHT SOURCE

CROSS-REFERENCE TO RELATED APPLICATIONS

This application claims priority to U.S. Provisional Patent Application No. 62/591,904, filed on Nov. 29, 2017, the entirety of which is hereby incorporated herein by reference.

FIELD OF THE INVENTION

This invention pertains generally to agronomic weed control. In particular, this invention provides for methods and apparatus for agronomic weed control by exposing undesired vegetation to high intensity lights sufficient to kill the undesired vegetation.

BACKGROUND

In order to produce high-yielding food crops, the desired crops must be relatively free from competing undesired plants (weeds). The current state of the art utilizes toxic chemicals and genetically modified (GMO) crops resistant to said chemicals, which have damaging environmental impacts, and increase costs for farm operators. Prior to GMO crops, multiple toxic chemicals and soil disturbing, erosion promoting, and fuel intensive tillage has been used for weed control.

As an alternative to the use of chemicals or tillage, a flame weeder kills weeds by applying flame to undesired vegetation. While the flame weeder avoids the negative effects of agricultural chemicals and tillage, it is fuel intensive.

Thus, a weed control method that avoids the negative impact of chemicals and intensive tillage that also minimizes or eliminates fuel use is desired.

BRIEF SUMMARY

In accordance with one embodiment of the invention, an apparatus and method for weed control are provided. The apparatus comprises a power subassembly, a tractor, and a light subassembly. The power subassembly comprises a solar panel and a power management module, and is configured to provide renewable energy to other components of the apparatus. The tractor is configured to convey the apparatus over an area of land. The light subassembly comprises a high intensity light source. As the apparatus traverses over an area of land, vegetation directly beneath the light subassembly is exposed to high intensity light configured to kill unwanted vegetation.

An object of this invention is to provide a method to control undesired vegetation growth in agricultural production applications. Growth management and weed killing may be accomplished by localized heating and tissue damage of target vegetation or by another mode of action induced by exposing plant tissue to high intensity light source.

It is a further object of this invention to provide such a method for providing a control and operating mechanism to control light energy dosage based on presence or absence of vegetation manner.

It is a further object of this invention to provide such an improved control system for operating the energy-intensive weed control process to act as a power grid stabilization and regulation function, by adjusting input power based on a signal from a power grid regulator ('balancing authority') or via a real-time market based mechanism. (Smart grid integration).

The proposed apparatus and method can be implemented using less total embodied energy than those of toxic chemicals, or extensive tillage, and can be powered entirely by on-farm renewable solar and wind energy electrical generation sources.

BRIEF DESCRIPTION OF THE DRAWINGS

Figure 1:
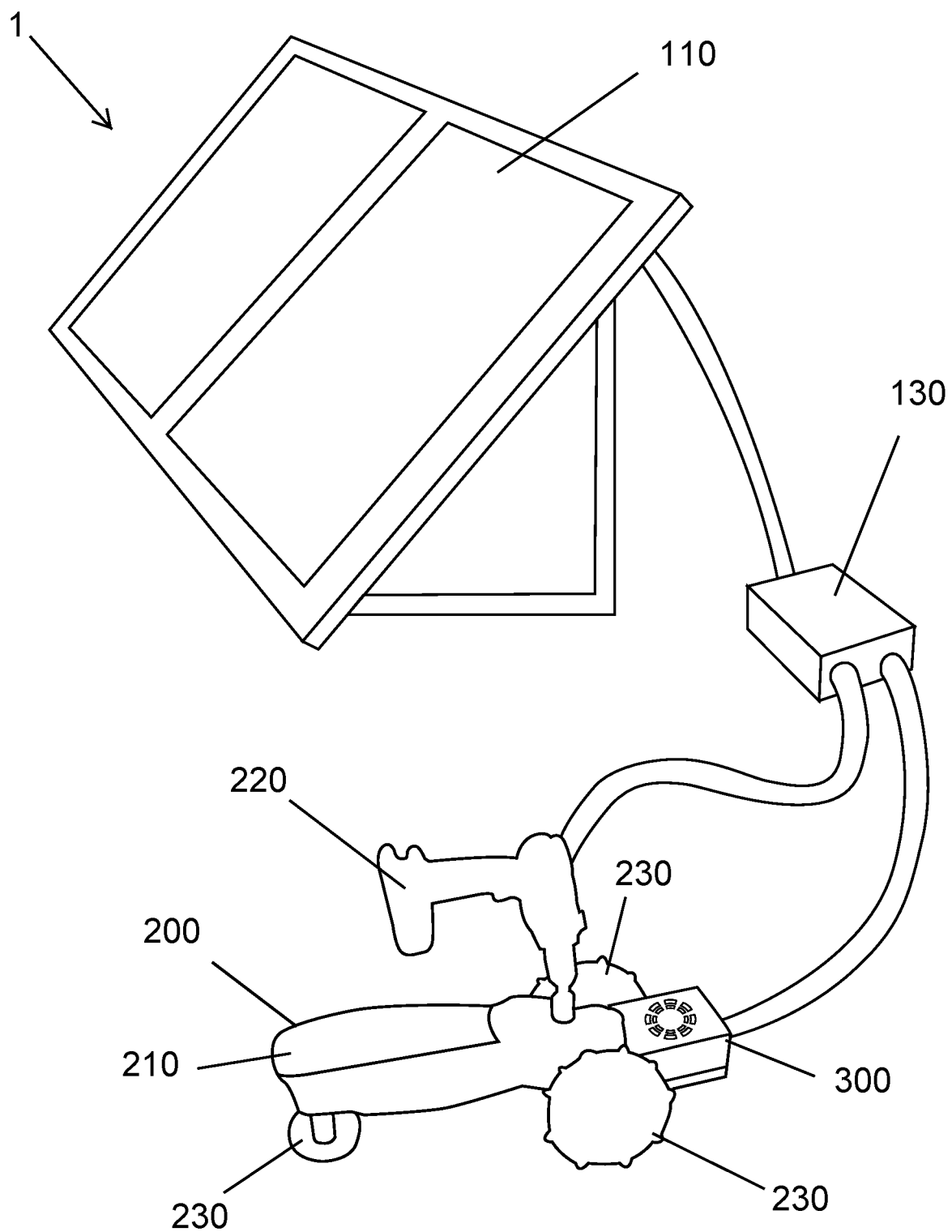

Having thus described the invention in general terms, reference will now be made to the accompanying drawings, which are not necessarily drawn to scale, and wherein:

FIG. 1 illustrates an external side view of an apparatus for controlling unwanted vegetation in accordance with an embodiment of the invention.

Figure 2:
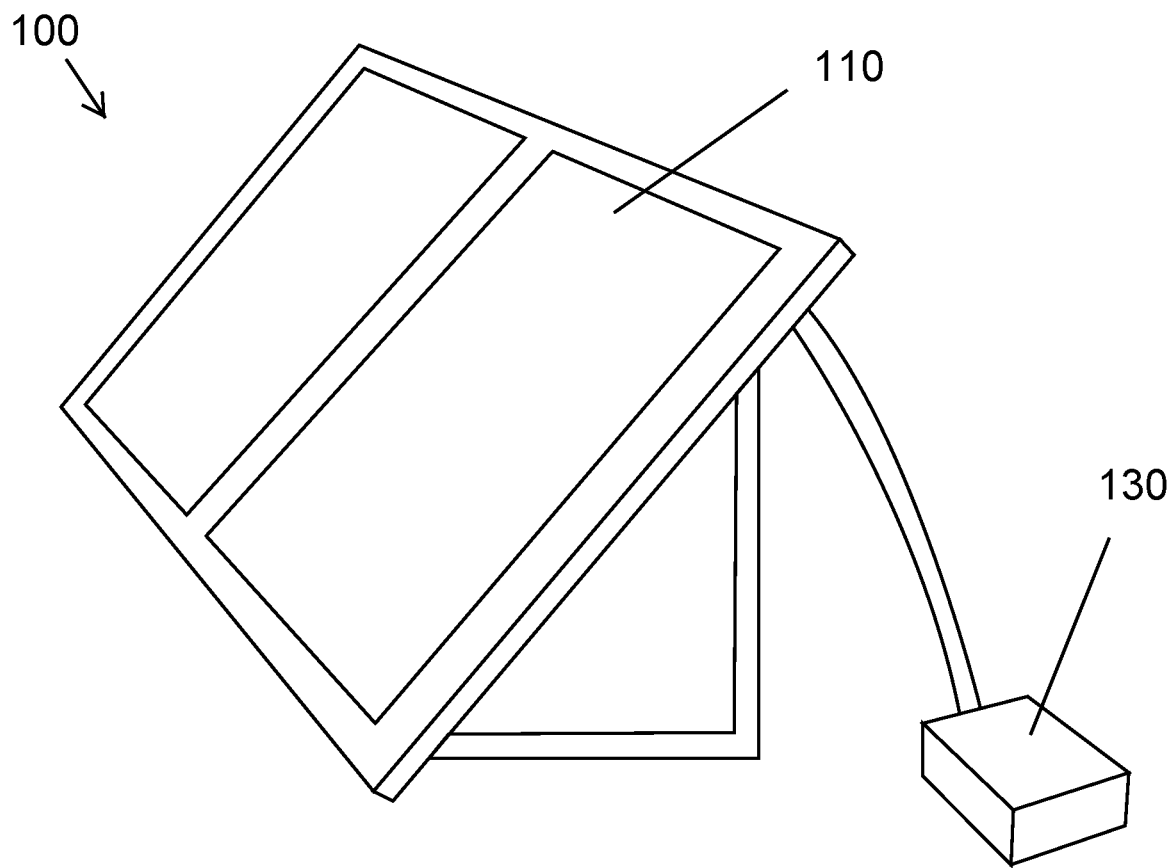

FIG. 2 illustrates a power subassembly of an apparatus for controlling unwanted vegetation in accordance with an embodiment of the invention.

Figure 3:
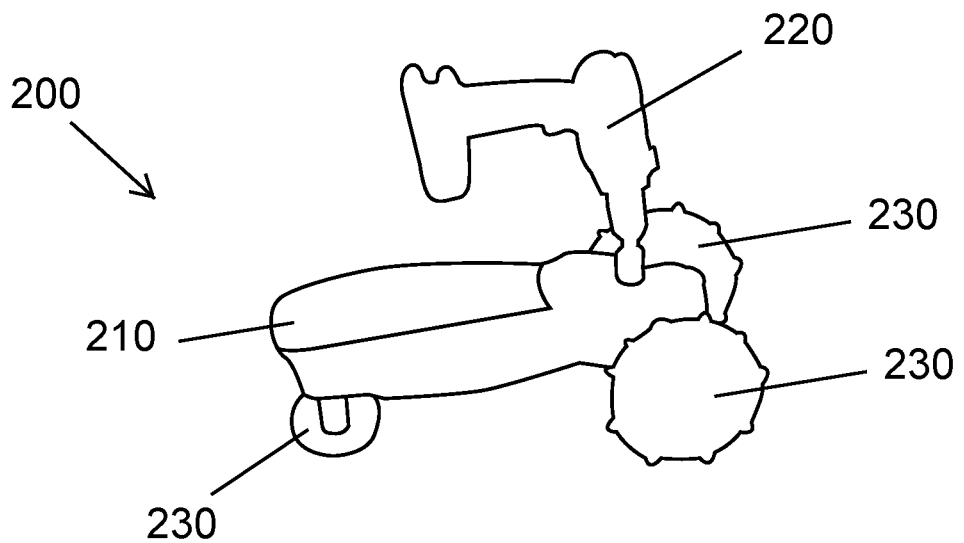

FIG. 3 illustrates a tractor of an apparatus for controlling unwanted vegetation in accordance with an embodiment of the invention.

Figure 4:
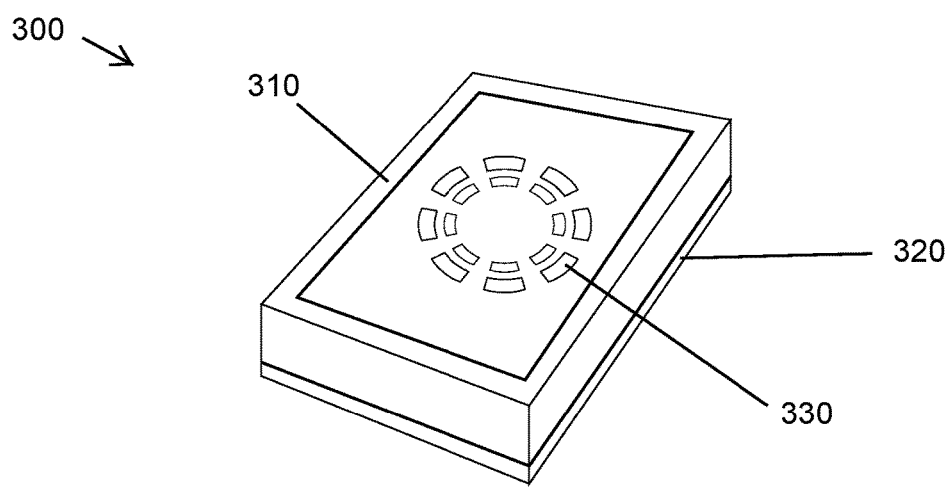

FIG. 4 illustrates a light subassembly of an apparatus for controlling unwanted vegetation in accordance with an embodiment of the invention.

Figure 5:
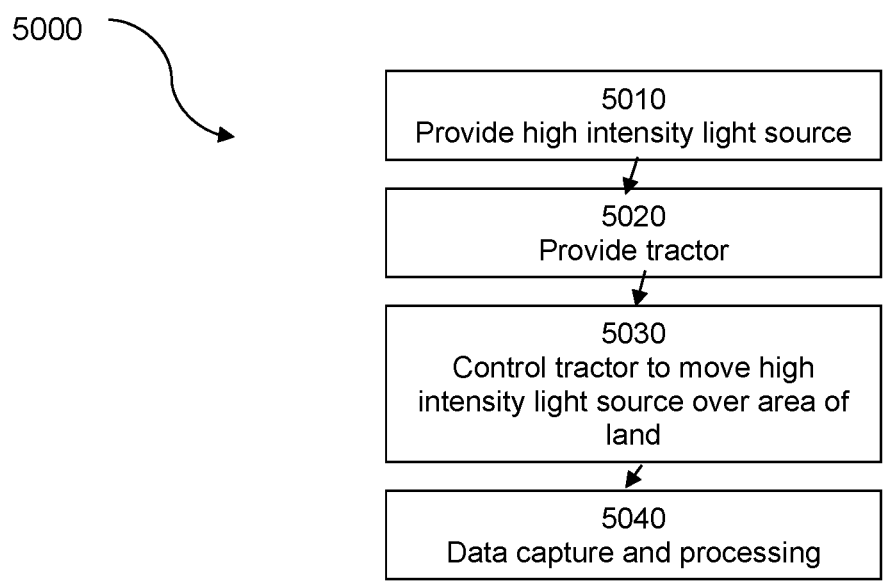

FIG. 5 illustrates a method for controlling unwanted vegetation in accordance with an embodiment of the invention.

Figure 6:
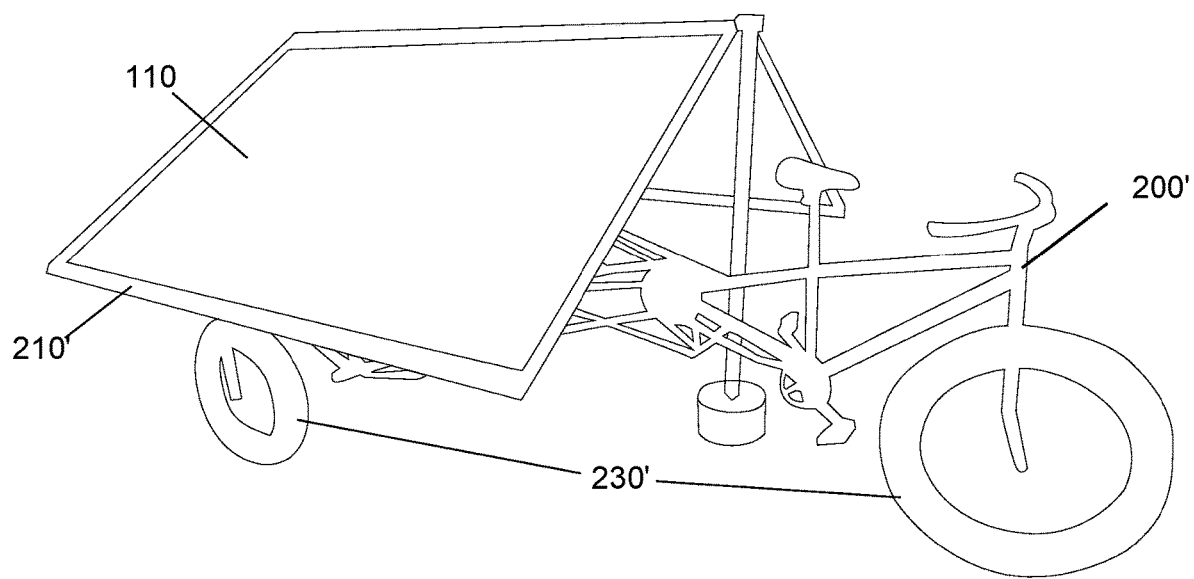

FIG. 6 illustrates an alternative embodiment of a tractor of an apparatus for controlling unwanted vegetation in accordance with an embodiment of the invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the apparatus are not shown in one or more of the figures for clarity and to facilitate explanation of embodiments of the present invention.

In accordance with one embodiment, FIG. 1 illustrates an apparatus 1 for controlling weeds using a high intensity light source. Apparatus 1 comprises a power subassembly 100, a tractor 200, and a light subassembly 300. Apparatus 1 may further comprise one or more embedded processor and user-interface elements configured to communicate with and control the components of apparatus 1 via wired or wireless connection. User interface interaction with the processor elements may be via direct tactile switches, touch-screen tablets and/or smartphone apps, visual gesture recognition, or audio voice recognition.

Power Subassembly 100

As shown in FIG. 2., in one embodiment power subassembly 100 comprises a solar panel 110 and a power management module 130. The solar panel 110 collects solar energy, converts it to electricity, and stores it internally in a battery for use by the tractor 200, the light subassembly 300, and any other components of apparatus 1 that require electrical power. The battery of solar panel 110 is electrically connected to the power management module 130. The power management module 130 provides power conditioning for the electrical energy stored in the battery of the solar panel 110, and is electrically connected to the tractor 200 and the light subassembly 300 via low-voltage DC power. The solar panel 110 and power management module 130 may be stationary or mounted on the tractor 200. If solar panel 110 and power management module 130 are stationary, mobile components are connected via movable wire tethers.

Tractor 200

As shown in FIG. 3, in one embodiment tractor 200 comprises a body 210, driver 220, and wheels 230. Tractor 200 is capable of movement over an area of land to cause the light subassembly 300 to travel over the area of land. The body 210 comprises a structure made of metal, plastic, wood, or other material to which the light subassembly 300 is mounted. Wheels 230 are rotatably attached to the body 210, allowing tractor 200 to roll over an area of land. In one embodiment, a lawn sprinkler tractor may be used as the body 210 and wheels 230 of tractor 200.

The driver 220 comprises a power supply that is electrically connected the power management module 130 and a shaft that is mechanically coupled to the wheels 230. Power supplied from the power management module 130 causes the shaft of the driver 220 to rotate. Rotation of the shaft causes rotation of the wheels 230, which in turn causes the tractor 200 to move. In one embodiment, a drill may be used as the driver 220.

As shown in FIG. 6, an alternative embodiment of a tractor 200', body 210' and wheels 230' are constructed from bicycle parts. In this alternative embodiment, a human operator takes the place of driver 220 for providing power to the tractor 200'. The power subassembly 100 and light subassembly 300 are mounted to a structure that is coupled to bicycle frame. The power subassembly in this alternative embodiment provides power to the light subassembly 300.

Light Subassembly 300

As shown in FIG. 4, the light subassembly 300 comprises a mobile platform 310 mounted to the body 210 of tractor 200, a high intensity light 320, and a power supply 330.

The mobile platform 310 comprises surfaces to which the components of the light subassembly 300 may be mounted, including the power supply 330 and high intensity light 320. Mobile platform 310 may be constructed of metal, wood, plastic, or other suitable material.

The high intensity light 320 is mounted to mobile platform 310 such that light is directed downward onto an area of land as the tractor 200 travels over the area. When vegetation is exposed to the light of high intensity light 320, surface heating of the vegetation's tissues occurs, causing the vegetation to die. High intensity light 320 may comprise one or more visible light sources (i.e. light emitting diodes (LEDs), incandescent bulbs, or lasers), near infrared light sources, or any combination. Experimental results show that commodity high-intensity blue LEDs in the 650 nm range provide the best cost/performance profile.

The power supply 330 is mounted to the mobile platform 310 and electrically connected to the power management module 130 and the high intensity light 320. Power supply 330 is capable of supplying power to the high intensity light 320.

Method

As shown in FIG. 5, a method 5000 for controlling unwanted vegetation using high intensity light begins at step S010 with providing a high intensity light source, such as the light subassembly 300 previously described, powered by renewable energy.

The method 5000 continues at step S020 with providing a tractor configured to move the high intensity light source. The tractor may be the tractor 200 or 200' as previously described.

The method 5000 continues at step S030 with controlling the tractor to move the high intensity light source over an area of land. Experimental results show browning of grass when the tractor 200 was operated at slow speed. When operated at high speed, the effect is barely visible, indicating higher power levels are required. Observation of the grass also indicated that only vegetation very close to the plastic window protecting the LED emitter was killed, and higher power levels may be required. The total irradiation dosage exceeds 1 kilowatt per square meter and a threshold dosage (joule per square meter).

The method 5000 may further comprise step S040 in which data is captured by a processor and provided to an operator in real time such that the operator can modify the path of travel or other behaviors of the apparatus 1 using the processor. Step S040 may comprise capturing images of vegetation and providing the images to an operator allowing the operator to identify undesired vegetation in real time and direct the high intensity light source to areas with unwanted vegetation. Further embodiments may contain machine-learning software and hardware to learn and then autonomously apply training from an operator.

Step S040 may comprise dynamically varying energy utilization and associated heat production based on a control input.

Step S040 may comprise managing costs when linked with real-time power markets.

Step S040 may comprise controlling heat production for a heat recovery power production.

Alternative Embodiments

In addition or as an alternative to the light subassembly 300, apparatus 1 may comprise attachments such as mechanical cutters for cutting or removing vegetation, or a high voltage, high power mechanism configured to apply electric current from target weeds to ground sufficient to disrupt further weed growth. Attachments can be powered and moved through the field under autonomous control by an on-board computing element. Further extensions may connect the tractor 200 via a tether or center-pivot type rotating platform to a fixed power grid which can be either isolated or connected to external power grids. If connected to external power grids with real-time market prices, software operating both on the apparatus 1 and in fixed grid interfaces will optimize operation of apparatus 1, weed control activities, and power production to maximize net farm revenue from electricity, crop market prices, and carbon credit/tax offsets.

Further enhancements may include replacing power subassembly 100 with a combustion engine specifically modified to produce oxides of nitrogen, and redirect the exhaust gas into the soil as a nitrogen fertilizer.

Software trading systems and aggregation of many distributed systems can be performed to increase the market value, liquidity, and effectiveness of food production, and increase value to consumers and farmers with full chain of custody recording of all inputs, the specific time of the input, and associated carbon source or sink intensity of the crop input, and expose this data to consumers via a public blockchain ledger.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for controlling undesired vegetation consisting of:
   a power subassembly providing energy from on-farm renewable electrical generation sources,
   a light subassembly comprising a plurality of light emitting diodes configured to produce visible light electrically connected to the power subassembly wherein the light subassembly is configured to be powered entirely by the on-farm renewable electrical generation sources, and
   a tractor coupled to the light subassembly and configured to move the light subassembly over an area of land such that the visible light is directed downward onto vegetation directly beneath the light subassembly and the vegetation directly beneath the light subassembly is directly exposed to the visible light from the light subassembly as the tractor travels over the area of land and wherein the vegetation exposed to the visible light from the light subassembly dies as a result of being exposed to the visible light from the light subassembly.

2. A method for controlling undesired vegetation consisting of:
   providing a tractor,
   providing a high intensity light source mounted to the tractor, wherein the high intensity light source comprises a plurality of light emitting diodes configured to produce visible light,
   wherein the tractor is configured to move the high intensity light source and wherein the high intensity light source is powered entirely by on-farm renewable electrical generation sources,
   controlling the tractor to move the high intensity light source over an area of land such that light is directed downward onto vegetation directly beneath the high intensity light source and the vegetation directly beneath the high intensity light source is directly exposed to the light from the high intensity light source as the tractor travels over the area of land and wherein the vegetation exposed to the light from the light subassembly dies as a result of being exposed to the light from the light subassembly,
   providing remote human-in-the-loop feedback to identify undesired vegetation in real time, and
   managing costs when linked with real-time power markets.

* * * * *